United States Patent
Uliyar et al.

(10) Patent No.: US 9,667,846 B2
(45) Date of Patent: May 30, 2017

(54) PLENOPTIC CAMERA APPARATUS, A METHOD AND A COMPUTER PROGRAM

(71) Applicant: Nokia Technologies Oy, Espoo (FI)

(72) Inventors: Mithun Uliyar, Bangalore (IN); Basavaraja Sv, Bangalore (IN); Gururaj Putraya, Bangalore (IN); Rajeswari Kannan, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 26 days.

(21) Appl. No.: 14/443,735

(22) PCT Filed: Apr. 26, 2013

(86) PCT No.: PCT/IB2013/053319
§ 371 (c)(1),
(2) Date: May 19, 2015

(87) PCT Pub. No.: WO2014/083439
PCT Pub. Date: Jun. 5, 2014

(65) Prior Publication Data
US 2015/0288859 A1 Oct. 8, 2015

(30) Foreign Application Priority Data
Nov. 27, 2012 (IN) .......................... 4928/CHE/2012

(51) Int. Cl.
| H04N 5/225 | (2006.01) |
| G02B 7/00 | (2006.01) |
| H04N 5/235 | (2006.01) |
| G02B 27/22 | (2006.01) |
| G02B 27/64 | (2006.01) |
| G02B 27/00 | (2006.01) |

(52) U.S. Cl.
CPC ........ *H04N 5/2254* (2013.01); *G02B 27/0075* (2013.01); *H04N 5/225* (2013.01); *H04N 5/2353* (2013.01); *G02B 27/2214* (2013.01); *G02B 27/64* (2013.01)

(58) Field of Classification Search
CPC ............. H04N 5/23212; H04N 5/2254; H04N 5/23209; H04N 5/23229; H04N 5/23296; H04N 13/0217; G02B 3/0056; G02B 3/0062; G03B 13/34; G03B 13/36
USPC ........ 396/322–340; 348/42–60, 218.1, 222.1
See application file for complete search history.

(56) References Cited

U.S. PATENT DOCUMENTS

| | | | | |
|---|---|---|---|---|
| 8,290,358 | B1 * | 10/2012 | Georgiev | G03B 35/10 396/326 |
| 8,305,429 | B2 * | 11/2012 | Kajihara | G03B 15/00 348/340 |
| 8,531,581 | B2 * | 9/2013 | Shroff | H04N 5/23212 348/335 |
| 8,680,451 | B2 * | 3/2014 | Iwane | G02B 7/36 250/206.1 |
| 8,947,578 | B2 * | 2/2015 | Park | H04N 5/23212 348/340 |
| 9,201,289 | B2 * | 12/2015 | Tanaka | G02B 3/0056 |
| 9,467,613 | B2 * | 10/2016 | Kadohara | H04N 5/23212 |

(Continued)

*Primary Examiner* — Michael Osinski
(74) *Attorney, Agent, or Firm* — Harrington & Smith

(57) ABSTRACT

An apparatus including camera optics; an array of plenoptic camera optics; an image sensor including a plurality of sensels; and a driver configured to cause relative physical movement of at least the camera optics and the array of plenoptic camera optics.

33 Claims, 3 Drawing Sheets

(56) References Cited

U.S. PATENT DOCUMENTS

| | | | |
|---|---|---|---|
| 9,485,406 B2* | 11/2016 | Sambonsugi | H04N 5/23212 |
| 2007/0230944 A1* | 10/2007 | Georgiev | H04N 5/2254 |
| | | | 396/322 |
| 2008/0165270 A1* | 7/2008 | Watanabe | G03B 17/58 |
| | | | 348/340 |
| 2009/0140131 A1* | 6/2009 | Utagawa | G02B 3/0056 |
| | | | 250/226 |
| 2009/0185801 A1* | 7/2009 | Georgiev | G03B 15/00 |
| | | | 396/332 |
| 2010/0066812 A1* | 3/2010 | Kajihara | G03B 15/00 |
| | | | 348/46 |
| 2010/0085468 A1* | 4/2010 | Park | H04N 5/23296 |
| | | | 348/345 |
| 2010/0277629 A1* | 11/2010 | Tanaka | H04N 5/2254 |
| | | | 348/280 |
| 2011/0001870 A1* | 1/2011 | Yamamoto | G02B 7/38 |
| | | | 348/351 |
| 2011/0019184 A1* | 1/2011 | Iwane | G02B 7/36 |
| | | | 356/123 |
| 2012/0044409 A1* | 2/2012 | Uchiyama | G03B 3/10 |
| | | | 348/345 |
| 2012/0120303 A1* | 5/2012 | Yamanaka | G02B 7/102 |
| | | | 348/347 |
| 2012/0300091 A1* | 11/2012 | Shroff | H04N 5/23212 |
| | | | 348/222.1 |
| 2013/0076930 A1* | 3/2013 | Border | H04N 5/23229 |
| | | | 348/222.1 |
| 2013/0076966 A1* | 3/2013 | Border | H04N 5/23245 |
| | | | 348/345 |
| 2013/0258140 A1* | 10/2013 | Lipson | G03B 3/10 |
| | | | 348/240.3 |
| 2014/0313371 A1* | 10/2014 | Sambonsugi | G03B 13/36 |
| | | | 348/231.6 |
| 2014/0368690 A1* | 12/2014 | Fukuda | H04N 5/369 |
| | | | 348/222.1 |
| 2015/0070474 A1* | 3/2015 | Bhat | H04N 13/0235 |
| | | | 348/49 |
| 2015/0109513 A1* | 4/2015 | Nayar | H04N 5/23212 |
| | | | 348/349 |
| 2015/0215593 A1* | 7/2015 | Sambongi | H04N 13/0232 |
| | | | 348/336 |
| 2015/0264335 A1* | 9/2015 | Park | G02B 3/0006 |
| | | | 348/49 |
| 2015/0358531 A1* | 12/2015 | Xu | H04N 5/232 |
| | | | 348/345 |

* cited by examiner

PLENOPTIC CAMERA APPARATUS, A METHOD AND A COMPUTER PROGRAM

TECHNOLOGICAL FIELD

Embodiments of the present invention relate to a plenoptic camera apparatus, a method and a computer program.

BACKGROUND

A plenoptic (or light field) camera simultaneously captures an image of a scene, through each one of multiple optics. The multiple optics may be provided, for example, as an array of micro-lenses, apertures or masks.

BRIEF SUMMARY

According to various, but not necessarily all, embodiments of the invention there is provided an apparatus comprising: camera optics; an array of plenoptic camera optics; an image sensor comprising a plurality of sensels; and a driver configured to cause relative physical movement of at least the camera optics and the array of plenoptic camera optics.

According to various, but not necessarily all, embodiments of the invention there is provided a method comprising: causing physical movement of camera optics relative to an image sensor; and causing contemporaneous physical movement of an array of plenoptic camera optics relative to the image sensor.

According to various, but not necessarily all, embodiments of the invention there is provided a computer program product comprising computer program instructions that, when loaded into a processor, enable: causing physical movement of camera optics relative to an image sensor; and causing contemporaneous physical movement of an array of plenoptic camera optics relative to the image sensor.

BRIEF DESCRIPTION

For a better understanding of various examples of embodiments of the present invention reference will now be made by way of example only to the accompanying drawings in which:

FIG. 1 illustrates an example of a plenoptic camera apparatus;

FIG. 2 schematically illustrates an example in which there is relative physical movement between camera optics, the array of plenoptic camera optics and the image sensor;

DETAILED DESCRIPTION

Figure 1:
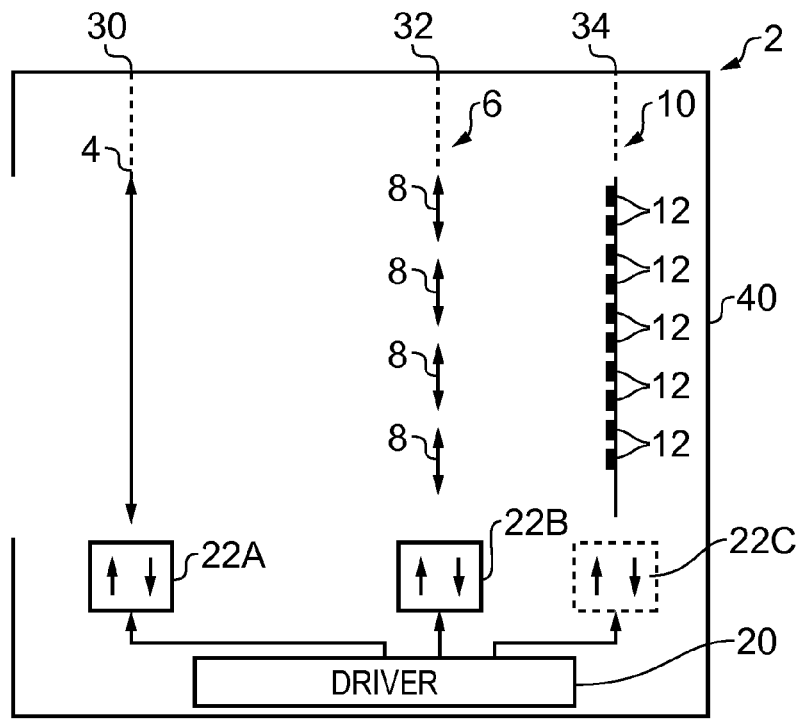

The Figures illustrate an apparatus 2 comprising: camera optics 4; an array 6 of plenoptic camera optics 8; an image sensor 10 comprising a plurality of sensels 12; and a driver 20 configured to cause relative physical movement of at least the camera optics and the array of plenoptic camera optics.

FIG. 1 illustrates an example of a plenoptic camera apparatus 2.

The plenoptic camera apparatus 2 may be an imaging device. It may, for example be a camera or a multi-functional device with a plenoptic camera as one of its functions. The apparatus 2 may be a portable device, that is, a device that is configured to be carried by a user. The apparatus 2 may be a hand-portable device, that is, a device that is sized to be carried in a palm of a user and capable of fitting in an inside jacket pocket. If the plenoptic camera apparatus 2 is a hand-portable multi-functional device, such as a mobile cellular telephone, then it may be desirable for an external aperture in a housing 40 for the plenoptic camera to be small.

This example of a plenoptic camera apparatus 2 comprises, within a housing 40, camera optics 4, an array 6 of plenoptic camera optics 8 and an image sensor 10 comprising a plurality of sensels 12.

The camera optics 4, the array 6 of plenoptic camera optics 8 and the image sensor 10 are arranged, in series, along an optical axis of the plenoptic camera apparatus 2.

The camera optics 4 comprises an aperture and/or one or more lenses. An optical plane 30 of the camera optics 4 is normal to the optical axis of the plenoptic camera apparatus 2.

The array 6 of plenoptic camera optics 8 occupies an optical plane 32 normal to the optical axis of the plenoptic camera apparatus 2 and parallel to the optical plane 30 of the camera optics 4. Each plenoptic camera optic 8 comprises an aperture, a mask or a lens. For example, the array 6 may be an array of micro-lenses, apertures or masks.

The image sensor 10 comprises an array of sensels 12 in an imaging plane 34 normal to the optical axis of the plenoptic camera apparatus 2 and parallel to the optical plane 30 of the camera optics 4 and the optical plane 32 of the array 6 of plenoptic camera optics 8.

An image sensel 12 is a sensor element. It is the sensing equivalent to a pixel (picture element). The data recorded by a sensel 12 when reproduced as an image corresponds to a pixel.

This example of the plenoptic camera apparatus 2 also comprises a driver 20 configured to cause relative physical movement between the camera optics 4, the array 6 of plenoptic camera optics 8 and the image sensor 10.

In this example, the driver 20 is configured to operate an actuator 22A associated with the camera optics 4. The actuator 22A is configured to physically move the camera optics 4 relative to the housing 40 in the optical plane 30 parallel to the imaging plane 34 of the image sensor 10.

In this example, the driver 20 is configured to operate an actuator 22B associated with the array 6 of plenoptic camera optics 8. The actuator 22B is configured to physically move the array 6 relative to the housing 40 in the optical plane 32 parallel to the imaging plane 34 of the image sensor 10.

In this example, the driver 20 is configured to operate an actuator 22C associated with the image sensor 10. The actuator 22C is configured to physically move the image sensor 10 relative to the housing 40 parallel to the imaging plane 34 of the image sensor 10.

Figure 2:
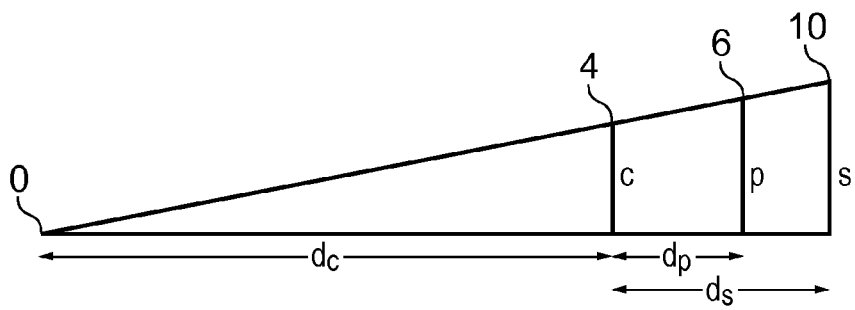

FIG. 2 schematically illustrates an example in which there is relative physical movement between the camera optics 4, the array 6 of plenoptic camera optics 8 and the image sensor 10.

FIG. 2 comprises a right-angled triangle. The base of the triangle represents a focused optical path from an object O through the camera optics 4 and the array 6 of plenoptic camera optics 8 to the image sensor 10, at time t1 before relative physical movement between the camera optics 4, the array 6 of plenoptic camera optics 8 and the image sensor 10.

The hypotenuse of the triangle represents a focused optical path from the object O through the camera optics 4 and the array 6 of plenoptic camera optics 8 to the image sensor 10, at time t2 after relative physical movement between the camera optics 4, the array 6 of plenoptic camera optics 8 and the image sensor 10.

In the example of FIG. 1, between times t1 and t2, the camera optics 4 physically moves upwards a displacement c relative to the housing 40 in the optical plane 30, the array 6 of plenoptic camera optics 8 moves upwards a displacement p relative to the housing 40 in the optical plane 32 and the image sensor 10 physically moves upwards a displacement s relative to the housing 40 in the imaging plane 34. These movements occur simultaneously.

This relative physical movement maintains focus of a reference point O in a scene captured by the image sensor 10 and maintains a position of the reference point at a particular sensel of the image sensor 10.

The displacements c, p, s of the camera optics 4, the array 6 of plenoptic camera optics 8 and the image sensor 10 within the respective parallel planes have a linear relationship.

The physical movement of the image sensor 10 relative to the housing 40 of the apparatus is greater than the physical movement of the array 6 of plenoptic camera optics 8 relative to the housing 40 of the apparatus. The physical movement of the array 6 of plenoptic camera optics 8 relative to the housing 40 of the apparatus is greater than the physical movement of the camera optics 4 relative to the housing 40.

If the distance between the in-focus object O and the optical plane 30 of the camera optics 4 is dc, the distance between the optical plane 30 of the camera optics 4 and the optical plane 32 of the array 6 of plenoptic camera optics 8 is dp and the distance between the optical plane 30 of the camera optics 4 and the imaging plane 34 of the image sensor 10 is ds, then using similar triangles:

$$s/c = (ds+dc)/dc$$

$$\Rightarrow s = k1 * c$$

where
k1 is a constant $(1+(ds/dc))$
&

$$p/c = (dp+dc)/dc$$

$$\Rightarrow p = k2 * c$$

where
k2 is a constant $(1+(dp/dc))$
Therefore $$c = p/k2 = s/k1, \text{ where } k2 > k1$$

The camera optics 4 has a physical aperture diameter D and a focal length f. It's real F-number FN is therefore f/D.

The camera optics 4 is moved, in its optical plane 30, by the driver 20 a distance c. The effective aperture diameter D' of the moving camera optics 4 is increased. In this example, it is D+c. The effective F-number FN' of the moving camera optics 4 has therefore decreased. In this example, it is f/D'.

The optical design of the plenoptic camera apparatus 2 may be based up the effective F-number FN' of the camera optics 4, rather than the real F-number FN. The effective F-number FN' is less than the real F-number FN.

A plenoptic camera optic 8 has a physical aperture diameter X and a focal length f. It's real F-number FNp is therefore f/X.

The array 6 of plenoptic camera optics 8 is moved, in its optical plane 32, by the driver 20 a distance p. The effective aperture diameter X' of the moving plenoptic camera optic 8 is increased. In this example, it is X+p. The effective F-number FNp' of the moving plenoptic camera optic 8 has therefore decreased. In this example, it is f/(X').

The optical design of the plenoptic camera apparatus 2 may be based up the effective F-number FN' of the plenoptic camera optics 8, rather than the real F-number FN. The effective F-number FN' is less than the real F-number FN.

For example, in a plenoptic camera apparatus 2 it may be desirable to optically match the camera optics 4 and the plenoptic camera optics 8. It may, for example, be desirable for the F-number of the plenoptic camera optics 8 to match the F-number of the camera optics 4. In this scenario, the effective F-number FNp' of the plenoptic camera optics 8 matches the effective F-number FN' of the camera optics 4. The camera optics 4 therefore has a real F-number FN greater than a real F-number of the plenoptic camera optics 8.

$$FNp = FNp' \&$$

$$FN < FNp$$

Figure 3:
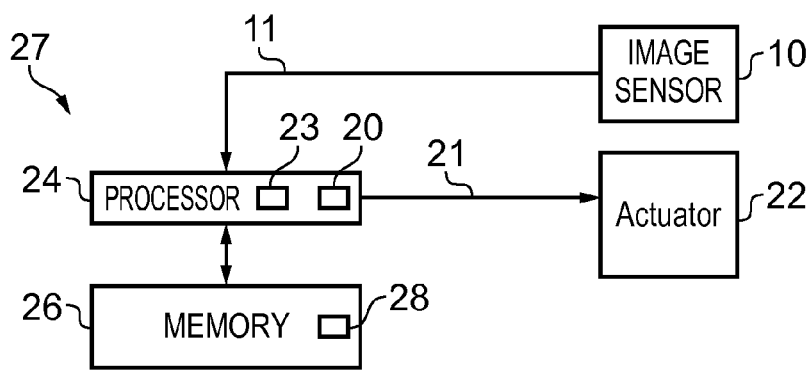
FIG. 3 illustrates an example of the plenoptic camera apparatus.

The physical aperture diameter D of the camera optics 4 may be small. For example, the real F-number of the camera optics 4 may be greater than 2.5 with a focal length of between 6 mm and 10 mm. The physical aperture diameter D of the camera optics 4 may, in this example, range between 2 mm and 4 mm FIG. 3 illustrates an example of the plenoptic camera apparatus 2. The figure illustrates an example of a driver 20 which controls actuators 22. The actuators 22 are used to move, relative to each other, the camera optics 4, the array 6 of plenoptic camera optics 8 and the image sensor 10.

In a first embodiment, the actuators physically move the camera optics 4, the array 6 of plenoptic camera optics 8 and the image sensor 10.

In a second embodiment, the actuators physically move only the camera optics 4, and the array 6 of plenoptic camera optics 8. The image sensor 10 is not physically moved but is virtually moved by processing an output 11 from the image sensor 10. There may therefore be no actuator 22C, as illustrated in FIG. 1, as the image sensor 10 does not need to physically move. In this embodiment, the value s illustrated in FIG. 2 does not represent a physical distance moved by the image sensor 10 but instead represents a shift in an origin of a captured image within the sensels 12 of the image sensor 10. A sensel that previously provided a pixel at (x, y) in an image will now provide a pixel at (x−Δx, y−Δy), where s=Δx+Δy.

In the example of FIG. 3, the driver 20 is provided by processing circuitry 27. It provides control signals 21 to the actuators 22.

In this example, the processing circuitry 27 that is used to provide the driver 20 is also used to provide an image processor 23 that process an output 11 from the image sensor 10.

The processing circuitry 27 may be configured such that the relative physical movement caused by the driver 20 maintains focus of a reference point in a scene captured by the image sensor 10.

In the first embodiment, the processing circuitry 27 may be configured such that the relative physical movement caused by the driver 20 maintains focus of a reference point in a scene captured by the image sensor and also maintains a position of the reference point at a particular sensel 12 of the image sensor.

In the second embodiment, the processing circuitry 27 may be configured such that the relative physical movement caused by the driver 20 maintains focus of a reference point in a scene captured by the image sensor and tracks a position of the reference point across the sensels 12 of the image sensor 10. This tracking is used by the image processor 23 to compensate the output 11 of the image sensor 10 to effect virtual movement of the image sensor 10.

It should be realised that it is possible to combine the first and second embodiments and both physically move the image sensor 10 and virtually move the image sensor 10.

The processing circuitry 27 in this example comprises a processor 24 and a memory 26. The memory 26 stores computer program instructions that enable the driver 20 and image processor 23.

Figure 4:
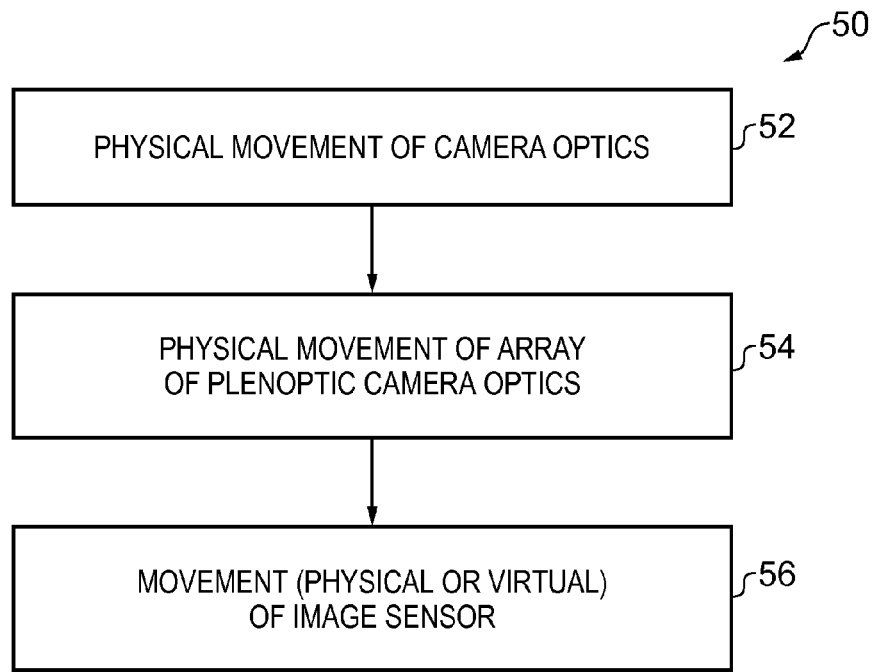
FIG. 4 illustrates a method which may be carried out of the plenoptic camera apparatus.

FIG. 4 illustrates a method 50 which may be carried out at the plenoptic camera apparatus 2, for example, by the processing circuitry 27 of FIG. 3.

At block 52, the driver 20 of the apparatus 2 causes physical movement of the camera optics 4 relative to an image sensor 10.

Contemporaneously, at block 54 the driver 20 of the apparatus 2 causes contemporaneous physical movement of an array 6 of plenoptic camera optics 4 relative to the image sensor 10.

The order of blocks 52 and 54 does not imply an order to the method but merely separates distinct activities within the method 50 that occur at the same time during an image exposure.

At block 54, the apparatus 2 causes movement of the image sensor.

In the first embodiment described above, the movement of the image sensor 10 is a physical movement caused by the driver 20. The physical movement is contemporaneous with blocks 52 and 54. The order of blocks 52, 54 and 56 does not imply an order to the method but merely separates distinct activities within the method 50 that occur at the same time during an image exposure.

In the second embodiment, the movement of the image sensor 10 is a virtual movement applied in post-processing of the output 11 of the sensels 12 of the image sensor 10 by the image processor 23.

Figure 6A:
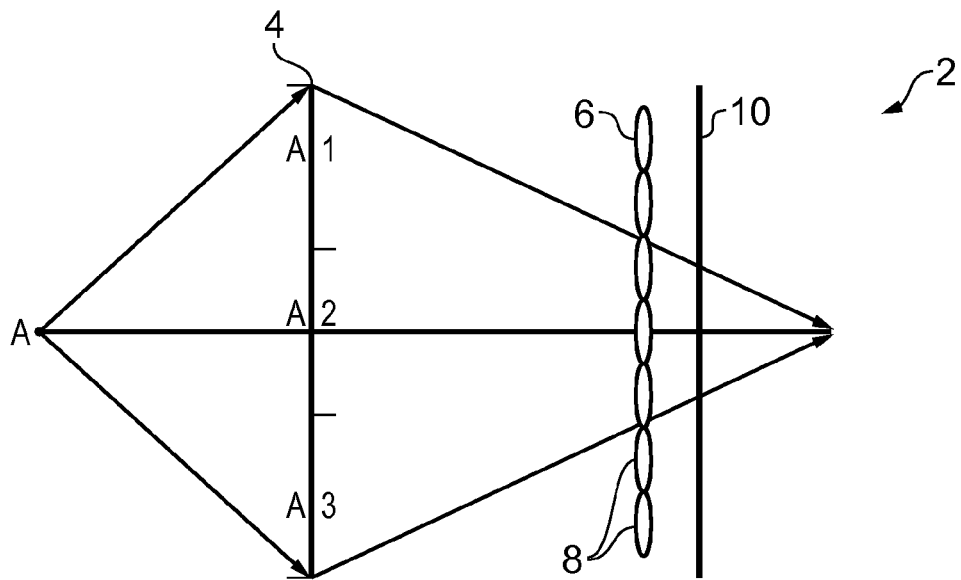
FIGS. 6A, 6B and 6C, illustrate aspects of use of an example of a plenoptic camera apparatus.
Figure 6B:
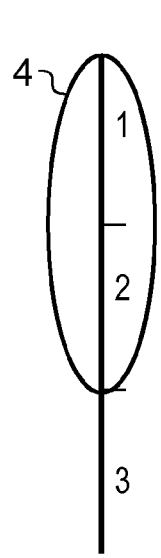
Figure 6C:
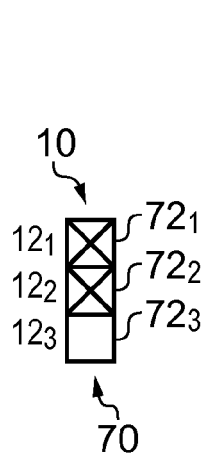
Figure 6C:
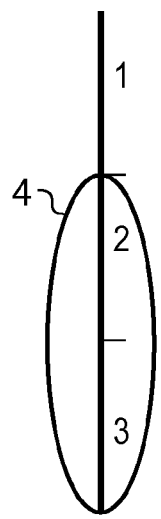
Figure 6C:
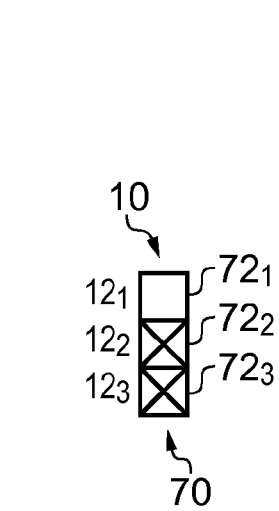

Referring to FIGS. 6A, 6B and 6C, one of many examples of how the plenoptic camera apparatus 2 may be used is illustrated.

FIG. 6A is similar to FIG. 1. It illustrates the camera optics 4 of FIG. 1, the array 6 of plenoptic camera optics 8 of FIG. 1 and the optical sensor 10 of FIG. 1. However, for the purposes of clarity it does not illustrate the housing 40, the actuators 22 nor the driver 20.

In this example, the apparatus 2 has N different perspectives P1, P2, P3 . . . PN of a single object A each sampled by different operational apertures A1, A2, A3 . . . AN of the camera optics 4.

Referring to FIGS. 6B and 6C, a set 70 of sensels $12_1$, $12_2$, $12_3$ . . . $12_N$ is used by the image sensor 10. A group $72_m$ of one or more of those sensels is associated with each perspective Pm of the respective perspectives P1, P2, P3 . . . PN.

In the particular example illustrated in FIGS. 6A, 6B and 6C, N=3, however other values of N are possible. Each group $72_m$ of sensels comprises a sensel $12_m$ associated with each perspective Pm of the respective perspectives P1, P2, P3.

Figure 5:
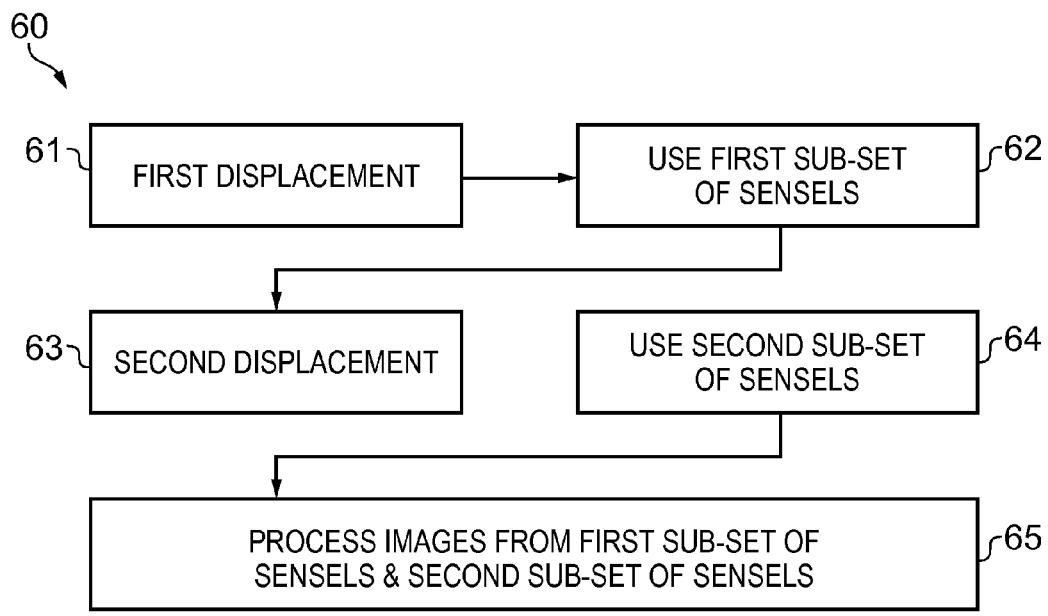
FIG. 5 illustrates a method that includes image processing.

FIG. 5 illustrates a method 60. The method 60 is a general method but will be described in the following paragraphs with respect to the particular example illustrated in FIGS. 6A, 6B and 6C of the apparatus illustrated in FIG. 1.

During a first exposure period the camera optics 4 are, at block 61, positioned such that a first sub-set of the N perspectives (e.g. {P1, P2}) are, at block 62, sampled at a corresponding first sub-set of sensels (e.g. {$12_1$, $12_2$})

Referring to block 61, the driver 20 is configured to cause a first displacement of at least the camera optics 4 and the array 6 of plenoptic camera optics 8 during the first exposure period as previously described. For example, referring to FIG. 2, c, p, s may be zero.

The camera optics 4 are displaced (e.g. by c) so that they occupy a first position that covers a first sub-set of the N different operational apertures (e.g. {A1, A2}) associated with the first sub-set of the N perspectives (e.g. {P1, P2}) but does not cover the other operational apertures (e.g. A3). Simultaneously at block 62, the first sub-set of the N perspectives (e.g. {P1, P2}) are sampled at a corresponding first sub-set of sensels (e.g. {$12_1$, $12_2$} but not $12_3$)

During a second exposure period the camera optics 4 are, at block 63, positioned such that a second sub-set of the N perspectives (e.g. {P2, P3}) are, at block 64, sampled at a corresponding second sub-set of sensels (e.g. {$12_2$, $12_3$}).

Referring to block 63, the driver 20 is configured to cause a second displacement of at least the camera optics 4 and the array 6 of plenoptic camera optics 8 during the second exposure period as previously described. For example, referring to FIG. 2, c and p may be non-zero with c=p/k1 and, in the first embodiment, s may be a physical displacement such that c=s/k2.

The camera optics 4 are displaced (e.g. by c) so that they occupy a second position that covers a second sub-set of the N different operational apertures (e.g. {A2, A3}) associated with the second sub-set of the N perspectives (e.g. {P1, P2}) but does not cover the other operational apertures (e.g. A1). Simultaneously at block 62, the second sub-set of the N perspectives (e.g. {P2, P3}) are sampled at a corresponding second sub-set of sensels (e.g. {$12_2$, $12_3$} but not $12_1$)

The first sub-set of sensels 12 and the second sub-set of sensels 12 may be relatively displaced by an integral number of sensels 12.

In this example, the second exposure period immediately follows the first exposure period and both occur during a single continuous image exposure. In other examples, there may be a delay between the first exposure period and the second exposure period.

Then at block 65, processing circuitry 27 that receives the output 11 from the image sensor 10, e.g. processor 24 in FIG. 3, is configured to process the first image and the second image taking into consideration parallax arising from the different first and second perspectives P1, P2.

For example, the image processor 23 may use computer vision techniques to identify interest points within the images, it may determine shifts of interest points within the images captured from different perspectives, it may then use known angular off-sets between the different perspectives and the determined shifts in interest points from the different perspectives to estimate a distance, from the apparatus 2, to the objects corresponding to the interest points using trigonometric equations or look-up tables.

In the example of FIGS. 6A, 6B and 6C, the first and second sub-sets of the N perspectives overlap, the first and second sub-sets of the N different operational apertures overlap, and the first and second sub-sets of sensels overlap.

Implementation of the driver 20 and image processor 20 may be as a single entity or as separate entities. They may be implemented in hardware alone (a circuit, a processor etc), have certain aspects in software including firmware alone or can be a combination of hardware and software (including firmware). They may be implemented using instructions that enable hardware functionality, for example, by using executable computer program instructions in a general-purpose or special-purpose processor that may be stored on a computer readable storage medium (disk, memory etc) to be executed by such a processor.

In the example of FIG. 3 they are implemented using a processor 24 which is configured to read from and write to a memory 26. The memory 26 comprises a computer program 28.

The processor 24 may be configured by the computer program 28 to perform the function of the driver 20. It may, for example, in the first embodiment cause execution of blocks 52, 54 and 46 of method 50. It may, for example, in the second embodiment cause execution of blocks 52 and 54. It may, for example, in the first and second embodiments cause execution of the blocks 61, 63 in the method 60.

The processor 24 may be configured by the computer program 28 to perform the function of the image processor 23. It may, for example, in the second embodiment execute block 56 and cause virtual movement of the image sensor by processing the output 11 of the image sensor 10.

The processor 24 may be configured by the computer program 28 to perform the function of the image processor 23. It may, for example, in the first and second embodiments, perform the function of block 65 in the method 60.

The processor 24 is configured to read from and write to the memory 26. The processor 24 may also comprise an output interface via which data and/or commands are output by the processor 24 and an input interface via which data and/or commands are input to the processor 24.

The memory 26 stores the computer program 28 comprising computer program instructions that control the operation of the apparatus 2 when loaded into the processor 24. The computer program instructions provide the logic and routines that enables the apparatus to perform the data processing and control methods described. The processor 24 by reading the memory 26 is able to load and execute the computer program 28.

The computer program may arrive at the apparatus 2 via any suitable delivery mechanism. The delivery mechanism may be, for example, a non-transitory computer-readable storage medium, a computer program product, a memory device, etc As used here 'module' refers to a unit or apparatus that excludes certain parts/components that would be added by an end manufacturer or a user.

The combination of camera optics 30, array 6 of plenoptic camera optics 8 and image sensor, with their respective actuators 22 (if any) may be provided as a module.

The combination of camera optics 30, array 6 of plenoptic camera optics 8 and image sensor, with their respective actuators 22 (if any) and driver 20 may be provided as a module.

The combination of camera optics 30, array 6 of plenoptic camera optics 8 and image sensor, with their respective actuators 22 (if any), processor 24 and memory 26 (with or without the computer program 28) may be provided as a module.

Some or all of the blocks illustrated in the FIG. 4 may represent steps in a method and/or sections of code in the computer program 28. The illustration of a particular order to the blocks does not necessarily imply that there is a required or preferred order for the blocks and the order and arrangement of the block may be varied. Furthermore, it may be possible for some blocks to be omitted.

Some or all of the blocks illustrated in the FIG. 5 may represent steps in a method and/or sections of code in the computer program 28. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   camera optics;
   an array of plenoptic camera optics;
   an image sensor comprising a plurality of sensels; and
   a driver configured to cause relative physical movement of at least the camera optics and the array of plenoptic camera optics, and wherein the driver is configured to cause relative physical movement of the camera optics, the array of plenoptic camera optics and the image sensor in parallel planes, parallel to an imaging plane of the image sensor.

2. An apparatus as claimed in claim 1, wherein the driver is configured such that the relative physical movement maintains focus of a reference point in a scene captured by the image sensor and maintains a position of reference point at a particular sensel of the image sensor.

3. An apparatus as claimed in claim 1, wherein the driver is configured to cause displacements of the camera optics, the array of plenoptic camera optics and the image sensor within the respective parallel planes with a linear relationship.

4. An apparatus as claimed in claim 1, further comprising a housing of the apparatus, wherein the driver is configured to cause physical movement of the camera optics relative to the housing of the apparatus, is configured to cause physical movement of the array of plenoptic camera optics relative to the housing of the apparatus and is configured to cause physical movement of the image sensor relative to the housing of the apparatus.

5. An apparatus as claimed in claim 4, wherein the driver is configured to cause simultaneous physical movement of the camera optics relative to the housing of the apparatus and physical movement of the array of plenoptic camera optics relative to the housing of the apparatus, wherein the physical movement of the array of plenoptic camera optics relative to the housing of the apparatus is greater than the physical movement of the camera optics relative to the housing.

6. An apparatus as claimed in claim 4, wherein the driver is configured to cause simultaneous physical movement of the array of plenoptic camera optics relative to the housing of the apparatus and physical movement of the image sensor relative to the housing of the apparatus, wherein the physical movement of the image sensor relative to the housing of the apparatus is greater than the physical movement of the array of plenoptic camera optics relative to the housing of the apparatus.

7. An apparatus as claimed in claim 1, wherein the driver is configured such that the relative physical movement maintains focus of a reference point in a scene captured by the image sensor.

8. An apparatus as claimed in claim 7, wherein the driver is configured to cause relative physical movement of the camera optics and the array of plenoptic camera optics and the image sensor such that displacements of the camera optics and the array of plenoptic camera optics within the respective parallel planes have a linear relationship.

9. An apparatus as claimed in claim 7, further comprising a housing of the apparatus, wherein the driver is configured to cause physical movement of the camera optics relative to the housing of the apparatus and is configured to cause physical movement of the array of plenoptic camera optics relative to the housing of the apparatus.

10. An apparatus as claimed in claim 9, wherein the driver is configured to cause simultaneous physical movement of the camera optics relative to the housing of the apparatus and physical movement of the array of plenoptic camera optics relative to the housing of the apparatus, wherein the physical movement of the array of plenoptic camera optics relative to the housing of the apparatus is greater than the physical movement of the camera optics relative to the housing.

11. An apparatus as claimed in claim 1, wherein the camera optics has a real F-number greater than an F-number of a plenoptic camera optic in the array of plenoptic camera optics.

12. An apparatus as claimed in claim 1, wherein a physical aperture diameter of the camera optics is less than 4 mm.

13. An apparatus as claimed in claim 1, wherein the driver is configured to cause physical movement of the camera optics such that it has an effective F-number equal to an F-number of plenoptic camera optics in the array of plenoptic camera optics.

14. An apparatus as claimed in claim 1, wherein the driver is configured to cause a first displacement of at least the camera optics and the array of plenoptic camera optics during a first exposure period in which a first sub-set of the plurality of sensels of the image sensor are used and wherein the driver is configured to cause a second displacement of at least the camera optics and the array of plenoptic camera optics during a second exposure period in which a second sub-set of the plurality of sensels of the image sensor are used.

15. An apparatus as claimed in claim 14, wherein the first sub-set of sensels and the second sub-set of sensels partially overlap.

16. An apparatus as claimed in claim 14, wherein the first sub-set of sensels and the second sub-set of sensels are relatively displaced by an integral number of sensels.

17. An apparatus as claimed in claim 14, wherein an image from the first sub-set for the first exposure period corresponds to a first image captured from a first perspective, wherein an image from the second sub-set for the second exposure period corresponds to a second image captured from a second perspective, different from the first perspective, the apparatus further comprising processing circuitry configured to process the first image and the second image taking into consideration parallax arising from the different first and second perspectives.

18. An apparatus as claimed in claim 1, wherein an optical plane of the camera optics, an optical plane of the array of plenoptic camera optics and an imaging plane of the image sensor are parallel.

19. An apparatus as claimed in claim 1, wherein the camera optics comprises at least one of an aperture and a lens.

20. An apparatus as claimed in claim 1, wherein the plenoptic camera optics each comprise an aperture, a mask or a lens.

21. An apparatus as claimed in claim 1, configured as an imaging device; a camera; a hand-portable device or a multi-functional device.

22. A method comprising:
    causing physical movement of camera optics relative to an image sensor;
    causing contemporaneous physical movement of an array of plenoptic camera optics relative to the image sensor; and
    causing contemporaneous physical movement of the image sensor,
    wherein the contemporaneous physical movement of the camera optics and the array of plenoptic camera optics is in parallel planes, parallel to an imaging plane of the image sensor.

23. A method as claimed in claim 22, comprising maintaining focus of a reference point in a scene captured by the image sensor.

24. A method as claimed in claim 22, wherein the contemporaneous physical movement of the camera optics and the array of plenoptic camera optics causes displacements of the camera optics and the array of plenoptic camera optics that have a linear relationship.

25. A method as claimed in claim 22, comprising:
    moving the camera optics relative to a housing of the camera optics;
    moving the array of plenoptic camera optics relative to the housing.

26. A method as claimed in claim 22, comprising:
    causing a first displacement of at least the camera optics and the array of plenoptic camera optics during a first exposure period in which a first sub-set of the plurality of sensels of the image sensor are used; and
    causing a second displacement of at least the camera optics and the array of plenoptic camera optics during a second exposure period in which a second sub-set of the plurality of sensels of the image sensor are used.

27. A method as claimed in claim 26, comprising:
    processing a first image from the first sub-set for the first exposure period and a second image from the second sub-set for the second exposure period taking into consideration parallax.

28. A non-transitory computer program product comprising a computer-readable storage medium including computer program instructions that, when loaded into a processor, enable:
    causing physical movement of camera optics relative to an image sensor; and causing contemporaneous physical movement of an array of plenoptic camera optics relative to the image sensor; and causing contemporaneous physical movement of the image sensor, where displacements of the camera optics and the array of plenoptic camera optics have a linear relationship.

29. A non-transitory computer program product as claimed in claim 28, wherein the computer program instructions, when loaded into a processor, enable:

maintaining focus of a reference point in a scene captured by the image sensor.

30. A non-transitory computer program product as claimed in claim 28, wherein the computer program instructions, when loaded into a processor, enable:

moving the camera optics relative to a housing of the camera optics;

moving the array of plenoptic camera optics relative to the housing.

31. A non-transitory computer program product as claimed in claim 28, wherein the computer program instructions, when loaded into a processor, enable:

causing a first displacement of at least the camera optics and the array of plenoptic camera optics during a first exposure period in which a first sub-set of the plurality of sensels of the image sensor are used; and causing a second displacement of at least the camera optics and the array of plenoptic camera optics during a second exposure period in which a second sub-set of the plurality of sensels of the image sensor are used.

32. A non-transitory computer program product as claimed in claim 31, wherein the computer program instructions, when loaded into a processor, enable:

processing a first image from the first sub-set for the first exposure period and a second image from the second sub-set for the second exposure period taking into consideration parallax.

33. An apparatus comprising:

camera optics;

an array of plenoptic camera optics;

an image sensor comprising a plurality of sensels; and a driver configured to cause relative physical movement of at least the camera optics and the array of plenoptic camera optics, wherein the driver is configured to cause a first displacement of at least the camera optics and the array of plenoptic camera optics during a first exposure period in which a first sub-set of the plurality of sensels of the image sensor is used and wherein the driver is configured to cause a second displacement of at least the camera optics and the array of plenoptic camera optics during a second exposure period in which a second sub-set of the plurality of sensels of the image sensor is used.

* * * * *